(12) United States Patent
Fan et al.

(10) Patent No.: US 8,443,449 B1
(45) Date of Patent: May 14, 2013

(54) SILENT DETECTION OF MALWARE AND FEEDBACK OVER A NETWORK

(75) Inventors: Chi-Huang Fan, Sanchong (TW); Chang-Hsing Ho, Taipei (TW); Yi-Hung Cheng, Bade (TW); Kun-Wei Lee, Taipei (TW)

(73) Assignee: Trend Micro, Inc., Tokyo (JP)

( * ) Notice: Subject to any disclaimer, the term of this patent is extended or adjusted under 35 U.S.C. 154(b) by 622 days.

(21) Appl. No.: 12/614,879

(22) Filed: Nov. 9, 2009

(51) Int. Cl.
*G06F 21/00* (2006.01)

(52) U.S. Cl.
USPC ............................................ 726/24; 713/188

(58) Field of Classification Search .................. 713/188; 726/22–26
See application file for complete search history.

(56) References Cited

U.S. PATENT DOCUMENTS

| | | | |
|---|---|---|---|
| 5,485,575 A * | 1/1996 | Chess et al. ................. | 714/38.13 |
| 8,079,085 B1 * | 12/2011 | Wu et al. ........................ | 726/24 |
| 2003/0135791 A1 * | 7/2003 | Natvig ............................ | 714/38 |
| 2004/0030914 A1 * | 2/2004 | Kelley et al. .................. | 713/200 |
| 2006/0075504 A1 * | 4/2006 | Liu .................................. | 726/25 |
| 2006/0294590 A1 * | 12/2006 | Enstone et al. ................. | 726/24 |
| 2007/0128899 A1 * | 6/2007 | Mayer ............................. | 439/152 |
| 2007/0192866 A1 * | 8/2007 | Sagoo et al. .................... | 726/24 |
| 2008/0010683 A1 * | 1/2008 | Baddour et al. ................ | 726/24 |
| 2009/0300149 A1 * | 12/2009 | Ferris et al. .................... | 709/222 |
| 2010/0332593 A1 * | 12/2010 | Barash et al. .................. | 709/203 |

OTHER PUBLICATIONS

King, "Analyzing Intrusions Using Operating System Level Information Flow", a PhD dissertation, University of Michigan, 2006, http://web.eecs.umich.edu/~pmchen/papers/king06_1.pdf, 91 pages.*

* cited by examiner

*Primary Examiner* — Hadi Armouche
(74) *Attorney, Agent, or Firm* — Beyer Law Group LLP (57) ABSTRACT

Upon detection of a suspicious file, a client computer sends feedback data to an anti-malware service over the Internet. Files that are not suspicious or that are known clean are not reported; files that are known malware are acted upon immediately without needing to report them to the anti-malware service. Upon detection, no alert or warning is provided to the user of the client computer. The anti-malware service correlates data from other detection engines on the client computer or from other client computers and determines whether the file is malware or not. A new virus pattern is generated if the file is malware and includes the virus signature of the file; the new virus pattern is distributed back to the client computers. If not malware, no action need be taken, or, the virus signature of the file is removed from existing pattern files.

15 Claims, 8 Drawing Sheets

504 Top 5 Suspicious Process (Application)
Time Range - Last 24 Hours

| Rank | Process (508) | Behavior (512) | Count (516) | Percentage (520) |
|---|---|---|---|---|
| 1 | C:\Documents and Settings\All Users\Application Data\Proxy Long Chin Ping\phone shim.exe | Drop File | 1,644,423 | 48% |
| 2 | C:\Documents and Settings\kent_han\Local Settings\Temp\1144.exe | Drop File | 1,293,035 | 38% |
| 3 | C:\WINNT\msdownld.tmp\AS0369F6.tmp\w2k\excp.exe | DLL Injection | 106,463 | 6% |
| 4 | C:\Documents and Settings\Administrator\Desktop\vista activator2007(vita????).exe | Modified Registry | 90,781 | 5% |
| 5 | C:\Documents and Settings\cathy_yeh.TREND\Local Settings\Temp\staA.exe | Create Process | 52,253 | 3% |

*FIG. 5A*

524 Top 5 Dropped File
Time Range - Last 24 Hours

| Rank | File Path (528) | SHA1 (532) | Count (536) | Percentage (540) |
|---|---|---|---|---|
| 1 | C:\WINDOWS\system32\drivers\acpidisk.sys | A1E23DW3E27 | 1,644,423 | 48% |
| 2 | C:\WINDOWS\system32\winlogon.exe | A1E23DW3E41 | 1,293,035 | 38% |
| 3 | C:\WINDOWS\Exeplorer.exe | A1E23DW3E65 | 106,463 | 6% |
| 4 | C:\WINDOWS\taskmgr.exe | A1E23DW3E80 | 90,781 | 5% |
| 5 | C:\WINDOWS\rundll.exe | A1E23DW3E31 | 52,253 | 3% |

*FIG. 5B*

544 Top 5 Dropped Registry
Time Range - Last 24 Hours

| Rank | Registry Key (548) | Value (552) | Count (556) | Percentage (560) |
|---|---|---|---|---|
| 1 | HKLM\SOFTWARE\Microsoft\Windows\CurrentVersion\Run | QCWLIcon | 1,644,423 | 47% |
| 2 | HKCU\Software\Microsoft\Windows\CurrentVersion\Run | YahoolMini | 1,293,035 | 35% |
| 3 | HKLM\SOFTWARE\MICROSOFT\Internet Explorer\Main | Default_Page_URL | 106,463 | 6% |
| 4 | HKCU\Software\Microsoft\Internet Explorer\Main | Start Page | 90,781 | 5% |
| 5 | HKCU\Software\Microsoft\Windows\CurrentVersion\Internet Settings | ProxyServer | 52,253 | 3% |

*FIG. 5C*

| Time | Client | File Path | | Registry / API | |
|---|---|---|---|---|---|
| 3/5/2008 16:12:18 | TW-Txx | C:\Program Files\QuickTime\QTTask.exe | Registry | HKLM\SOFTWARE\Microsoft\Windows\CurrentVersion\Run\QuickTime Task | Write |
| 3/3/2008 16:51:37 | TW-Jxx | C:\Program Files\Yahoo!\Mini\YMiniUpdat2.exe | Registry | HKCU\Software\Microsoft\Windows\CurrentVersion\Run\Yahoo!Mini | Write |
| 2/29/2008 18:58:55 | TW-Gxx | C:\Program Files\WinZip\WZQKPICK.EXE | API | NtUserSetWindowsHookAW | Invoke |
| 3/3/2008 11:40:26 | TW-Yxx | C:\Program Files\ThinkPad\ConnectUtilities\QCWLICON.exe | Registry | HKLM\SOFTWARE\Microsoft\Windows\CurrentVersion\Run\QCWLIcon | Write |
| 3/3/2008 10:09:36 | TW-Pxx | C:\Program Files\ThinkPadConnectUtilities\SvcGuiHlpr.exe | Registry | HKCU\Software\Microsoft\Windows\CurrentVersion\Internet Settings\ Proxy Server | Write |
| 2/28/2008 18:53:49 | TW-Jxx | C:\Program Files\ThinkPad\Bluetooth Software\BTTray.exe | API | NtUserSetWindowsHookEx | Write |

False Positive Results from Feedback Data

SILENT DETECTION OF MALWARE AND FEEDBACK OVER A NETWORK

FIELD OF THE INVENTION

The present invention relates generally to detection of malware in a computer network. More specifically, the present invention relates to using feedback from client machines in malware detection.

BACKGROUND OF THE INVENTION

Today, the detection of malicious software becomes more challenging as the World Wide Web becomes the preferred distribution system for malware. There exist JavaScript-based malware installers, Web-based robot network ("botnet") control interfaces (e.g., MPack, IcePack, WebAttacker, Zunker, etc.), and fast-cycling malware Web sites. It can be difficult to source and collect malware samples and there is a larger time delay not only waiting for a customer to reveal that their enterprise is infected, but also in waiting for a virus pattern to be deployed.

With the increase in viruses, worms, spyware, etc., and other types of computer malware, current antivirus and anti-malware software is becoming more aggressive in detecting malicious software. Often, beta patterns or aggressive patterns are used by anti-malware software in an attempt to better detect malware. Beta patterns are typically patterns that are newly written and still under an internal beta test period, while aggressive patterns are patterns that may have a better detection rate but also have a slightly higher positive alarm rate.

Inevitably, though, use of beta and aggressive patterns results in more false positives and increased hardship upon users of client machines and enterprise system administrators. Traditionally, antivirus vendors have responded to the increase in false positives by providing user-configurable options with their antivirus software that dictate what happens when suspicious files are detected. These options are typically: an aggressive level (specific actions will be taken to eliminate or control the malware); a warning level (this option means that warnings are given but the file may not be removed); and a no action level (if a suspicious file is detected no action will be taken but the user will be alerted). Specific actions can be: "Clean," "Move," "Delete," "Quarantine," and "Warn, but Do Nothing." Further, most products have different user interfaces and different meanings for these actions.

Unfortunately, and therefore, most computer users, system administrators and other managers of antivirus software do not have sufficient knowledge about what these options mean or the ramifications of the various actions in order to make the right choice. The result is often a reduction in malware detection, burdensome actions occurring on user computers, or too many false positives.

It would be desirable for a technique and system to better reduce false positives in the course of malware detection while still providing a high level of security.

SUMMARY OF THE INVENTION

To achieve the foregoing, and in accordance with the purpose of the present invention, a technique is disclosed that provides feedback from client machines up to a central anti-malware service to aid in the detection of malware.

Preferably, the anti-malware service is located remotely ("in-the-cloud") and the in-the-cloud computer servers perform analysis, validation and correlation using feedback from any number of client machines that are using beta patterns, aggressive patterns or regular patterns. Through the use of feedback, the impact on client machines due to the use of beta or aggressive patterns is reduced or eliminated. Additionally, the in-the-cloud analysis allows beta pattern testing in a client environment to be performed more easily and efficiently.

Most antivirus software—that is detection engines—use specific actions such as blocking, renaming, deleting or displaying pop-up messages when malware is detected. If a great number of false positives are present, these specific actions can be intrusive and burdensome upon a client machine and its user. The present invention defines a new action type—"feedback"—that does not block, delete, etc., when malware is detected. Instead, assuming consent of the computer user, it silently sends information about the malware detection to an in-the-cloud computer server; this information includes the signature of the file detected, any events that triggered the detection, from where the file is downloaded, the executable file itself, etc. Advantageously, such action at the time is transparent to the user and his or her computer, thus reducing burdensome actions resulting from false positives. The information may then be analyzed, validated and correlated at the in-the-cloud server, which can then take further actions if necessary. For example, the feedback loop may be completed by delivering a trial-run solution (e.g., a heuristic rule or a virus signature) from the in-the-cloud server back to the client machine in order to prevent or eliminate the newly detected malware.

As mentioned, one advantage is that the impact on client machines due to false positives is reduced because of the silent detection used. Also, the sourcing of malicious or normal file samples (actual file or CRC value) from client machines enables better white list creation (for normal files) and identification of malware (even if the sample file is not provided). Further, data mining of the feedback data from client machines can proactively detect unknown threats before they cause harm. Also, use of the feedback data to generate an immediate trial-run solution shortens the beta pattern testing cycle.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
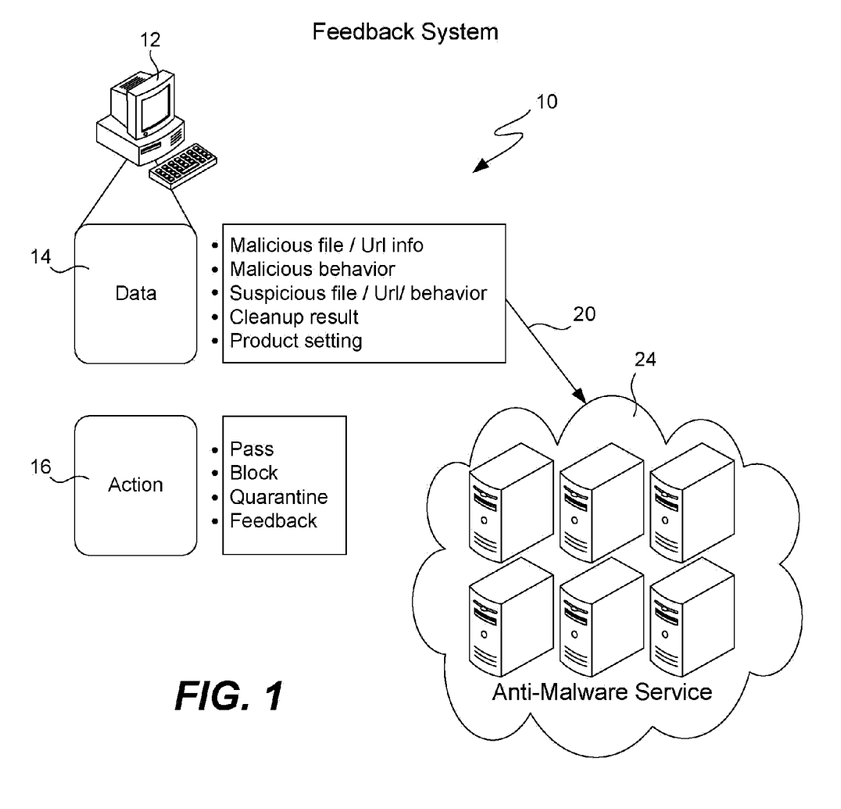
FIG. 1 illustrates a new concept of feedback.

FIG. 1 illustrates this new concept of feedback. Shown is a feedback system 10 that includes a user computer 12 of a typical enterprise; the user computer is running one or many of a variety of antivirus software programs used to scan files, apply rules, check URL reputations, etc., in order to detect suspicious files or known malware files. The actions 16 that the antivirus software may take upon detection of a suspicious file include: blocking the file from execution; passing on the file; quarantining the user computer 12 (thus preventing it from communicating with other computers); renaming the suspicious file (not shown) (the user moves the file to a safe location, one that possibly is not scanned); deleting the suspicious file (not shown); displaying a pop-up message warning the user (not shown); or cleaning the file to remove malware.

As shown, a new action included with the present invention is a concept of feedback. Not only will the feedback option send information back to the anti-malware service 24, but also it is a designated action within a detection engine that enables execution of a trial-run solution to combat the malware. A detection engine is any type of antivirus software running on a user computer for the purposes of detecting and controlling malware such as a file scanning engine (e.g., VSAPI available from TREND MICRO), an engine that applies heuristics for the detection of new malware (e.g., AEGIS from TREND MICRO), or a reputation engine that uses a URL reputation database or service in order to detect malware (e.g., the Network Security Component, NSC, from TREND MICRO).

If the feedback option is used, a variety of information (such as a detection log) is sent from the user computer 12 to the anti-malware service 24 over a suitable Internet connection 20. For example, if a malicious file has been detected the information may include: the malicious file itself, its CRC or other hash value, the URL or other details concerning the origin of the file, and its malicious behavior. Malicious behavior can be, for example, any deletion of operating system components or dropping a file.

If it is only determined that a file is suspicious, the information may include: the suspicious file itself, its CRC or other hash value, the URL or other details concerning the origin of the file, and any suspicious behavior. In addition, any relevant configuration parameters of the detection engine may also be sent to the service. For example, there are configuration parameters related to whether the engine should calculate and feedback a file's hash value. If the detection engine has performed any cleanup after detection of the malware, then the cleanup results are also sent.

The anti-malware service 24 is any suitable service that analyzes malware and suspicious files, produces pattern files and heuristics, provides a URL reputation service, and delivers these results from an Internet-accessible location back to enterprises for use in preventing malware on end-user computers. For example, one such anti-malware service is Trend Labs, a unit of Trend Micro Inc.

Figure 2A:
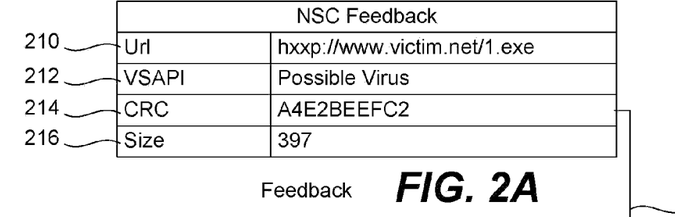
FIGS. 2A, 2B and 2C illustrate examples of feedback provided from a variety of detection engines.
Figure 2B:
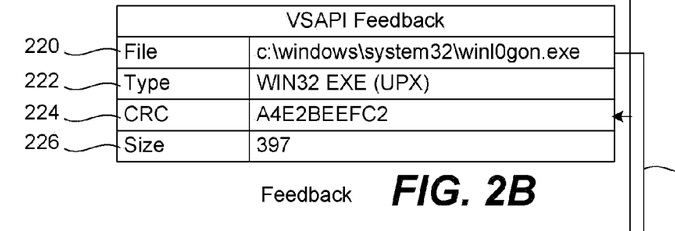
Figure 2C:
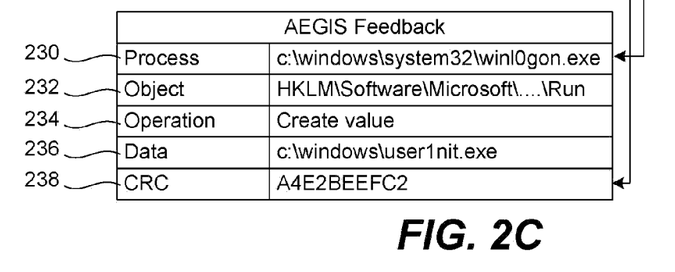

FIGS. 2A, 2B and 2C illustrate examples of feedback provided from a variety of detection engines. FIG. 2A illustrates feedback from a detection engine such as NSC that uses URL reputation. The feedback includes the URL 210 of the suspicious file, an indication 212 of whether or not the file is considered a virus (from a scanning engine), the CRC value 214 of the file, and its size in bytes 216. Other data may be included from such a URL reputation detection engine.

FIG. 2B illustrates feedback from a detection engine such as VSAPI that implements file scanning. The feedback includes the location of the file itself 220, the type of file it is 222, the CRC value 224 of the file, and its size in bytes 226. Other data may be included from such a scanning detection engine.

FIG. 2C illustrates feedback from a detection engine such as AEGIS that implements heuristics for malware detection. The feedback includes the location of the process itself 230, the object 232 upon which the file is operating, the operation 234 that has taken place, and any relevant data 236. Other data may be included from such a detection engine that uses heuristics.

Other information that may be included as feedback is: a customer profile such as identity, company, region and software environment; and the specific configuration of the user's computer from which the feedback is received (not shown).

Figure 3:
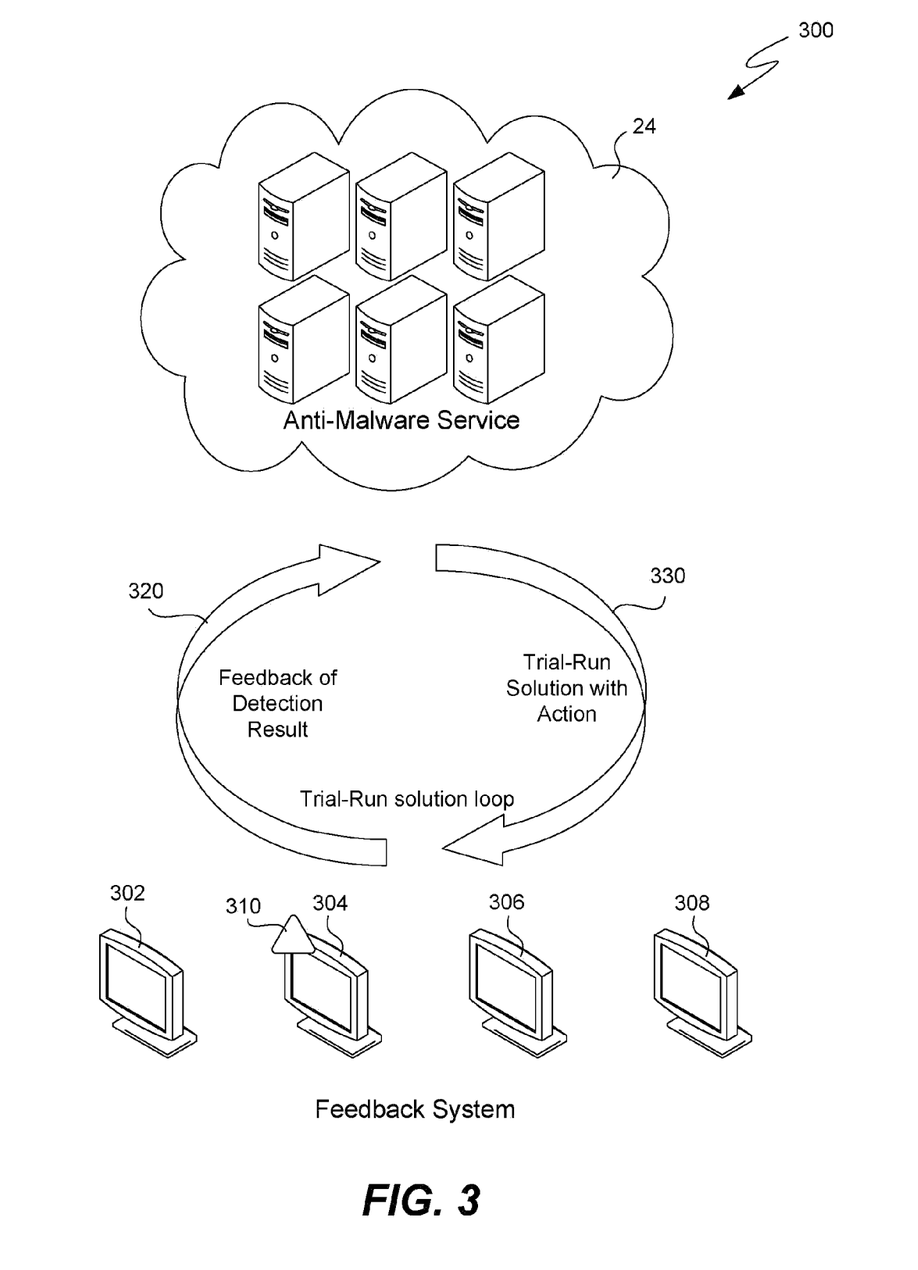
FIG. 3 illustrates another viewpoint of feedback system.

FIG. 3 illustrates another viewpoint of feedback system 300. Shown are any number of end-user computers 302-308 that are present within an organization, company or enterprise. A computer virus, worm or suspicious file 310 is present upon computer 304. Upon detection of the suspicious file, computer 304 sends feedback 320 as described above to the anti-malware service 24. Preferably, only suspicious files and their data are reported back to the anti-malware service. Files that are not suspicious or that are known clean are, of course, not reported, and files that are known malware are acted upon immediately without needing to report them to the anti-malware service. The advantage is that false positives are reduced because those suspicious files that are reported and found not to be malware can be ignored. Suspicious files reported that are found to actually be malware are then used to generate a trial-run solution that can be immediately deployed back to the client machine.

After analysis, the service sends a trial-run solution 330 back to the computer 304 for further action to be taken against the suspicious file. The trial-run solution 330 may include any combination of a virus signature, a heuristic, or a URL reputation to be used on the end user computer. The action accompanying the trial-run solution may also be an aggressive rule or virus signature that does not include blocking, a pop-up message, or other intrusive warnings for the user. It is likely that the trial-run still needs more positive supporting information from client machines. Therefore, in this situation, the engine with the trial run will not block or pop-up a message to interrupt the user's actions until the vendor is sure that the trial run accurately detects malware without false positives.

Referring again to FIGS. 2A, 2B and 2C, link 404 illustrates the result of a correlation analysis based on the feedback received at the anti-malware service. In this example, it is seen that the CRC value 214 from the URL reputation feedback is the same as the value 224 from the file scanning feedback (i.e., correlation).

Link 408 illustrates the result of a correlation analysis based on the feedback received at the anti-malware service. In this example, it is seen that the file 220 from the file scanning feedback is the same as the process 230 from the heuristic analysis feedback (i.e., correlation).

Once the feedback results have been correlated, a trial-run solution may be formulated for immediate download and execution on the user computer. For example, if the CRC values match between two different detection engines, that CRC value is assumed to identify a malicious file and its value is distributed back to the client computer for use in detecting the malicious file. In this fashion, the CRC value is automatically generated and distributed back to a detection engine such as a file scanning engine.

Further, because that CRC value is associated with a particular URL, that URL 210 is then distributed back to the client computer for use in blocking access to that particular Web site using a suitable detection engine. In this fashion, the malicious URL is automatically generated and distributed to a detection engine such as a reputation engine (NSC, for example).

Also, because file 220 has been identified in the file scanning engine and also as a suspicious process 230 in the heuristic engine, this file name is also distributed back to the client computer so that it may be blocked in the future by a suitable detection engine that uses heuristics such as AEGIS.

FLOW DIAGRAMS

Figure 4A:
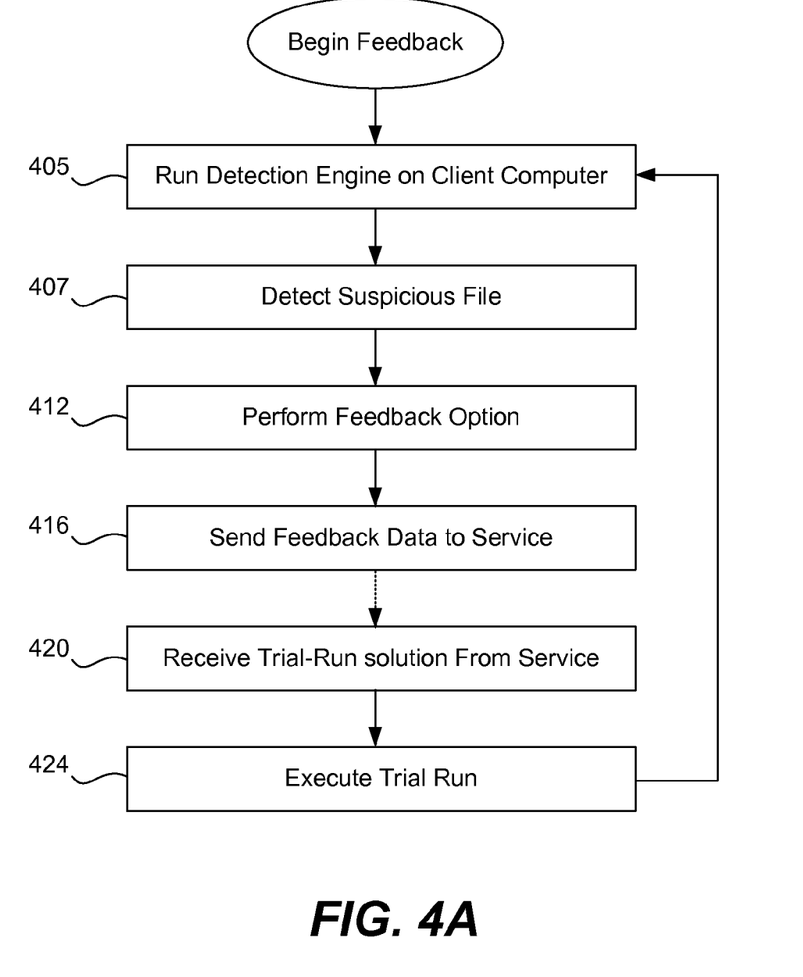
FIG. 4A is a flow diagram illustrating execution of a detection engine on a client computer.

FIG. 4A is a flow diagram illustrating execution of a detection engine on a client computer. As mentioned, this detection engine may be a scan engine, an engine based upon heuristics, an engine that detects malware based upon URL's, a traditional file scanning engine, an engine that detects abnormal system activity (such as file creation or registry changes) or an any other type of software engine designed to catch malware.

In step 405 a suitable detection engine utilizing the present invention is executing on a client computer such as computer 304. In step 407 suspicious activity occurs on the client machine and the detection engine detects this suspicious activity. This suspicious activity may be a change in behavior, suspicious network traffic, a suspicious URL, a suspicious file, suspicious activity, or other.

If the activity is suspicious and the detection engine makes the determination that a particular file is malware, then it is possible for the engine to take an action such as terminating the process, quarantining the computer, or other traditional intrusive actions that affect the client machine. These actions may occur in addition to feedback provided to the anti-malware service 24. Preferably, though, if only suspicious activity is detected, no intrusive actions are taken upon the client machine such as terminating a process, displaying a warning message or tone, etc.

In step 412, the detection engine performs the feedback option on the client machine based upon the detection of the suspicious activity. Preferably, although this option generates activity within detection engine software on the client machine, no feedback is provided to the user. The feedback option is transparent in that the user does not see a warning message, is not disturbed, and otherwise is not interrupted when the feedback option occurs. In this fashion, the user may continue to work on the client computer without disruption and without thinking about how to respond to a suspicious activity alert.

In step 416 the detection engine gathers data relevant to the detected suspicious activity and sends this feedback data (preferably encrypted) back to the anti-malware service 24. This feedback data may include data from the examples shown in FIGS. 2A, 2B, and 2C. The data may include information about the suspicious activity itself, a potential source file, etc. For example, a file scanning engine may send data such as: location of detected object, location of associated objects (e.g., the caller that uses the object), hash value of detected object, size of the object, relationship between associated objects and detected objects, hash value of associated objects, size of associated objects, date and time of detection, date and time of feed backing to the backend service, signature information, engine information, and type of detected object (e.g., executable, dynamic link library, text file, kernel driver, etc).

Of course, it is contemplated that there may be any number of detection engines running on any number client computers and all sending feedback data back to the anti-malware service at the same time. In this fashion, the anti-malware service can correlate feedback data from different client computers within a single enterprise, or from within a particular geographic region in order to more quickly and intelligently generate a response to the detected malware.

At this point, the anti-malware service analyzes the feedback data and generates a trial-run solution such as a new signature, a new pattern file, a new heuristic or new URL reputation data. This step is explained in more detail below with reference to FIG. 4B.

In step 420 a trial-run solution is received from the anti-malware service. In one example, the trial-run solution received by the client computer is a new pattern file typically consisting of different virus signatures. Preferably, the new pattern file includes a new virus signature designed to detect the malware responsible for the recently detected suspicious activity. This new pattern file may be sent to all users within a particular enterprise, to a single client who has reported the suspicious activity or to any of a number of client computers that are using a particular detection engine product. In addition, the trial-run solution may be a single new virus signature, a heuristic to be used in the detection engine or new URL reputation data.

In step 424 the client computer is then able to execute newly received pattern file in its detection engine in order to better detect malware. Of course, if the anti-malware service makes a determination that the detected suspicious activity was, in fact, not indicative of malware, then a false positive exists and no new pattern file need be returned to the client computer. In fact, in this situation, the client machine need not be disturbed at all. Steps 404, 408, 412, 416, 420 and 424 can be repeated as appropriate.

Figure 4B:
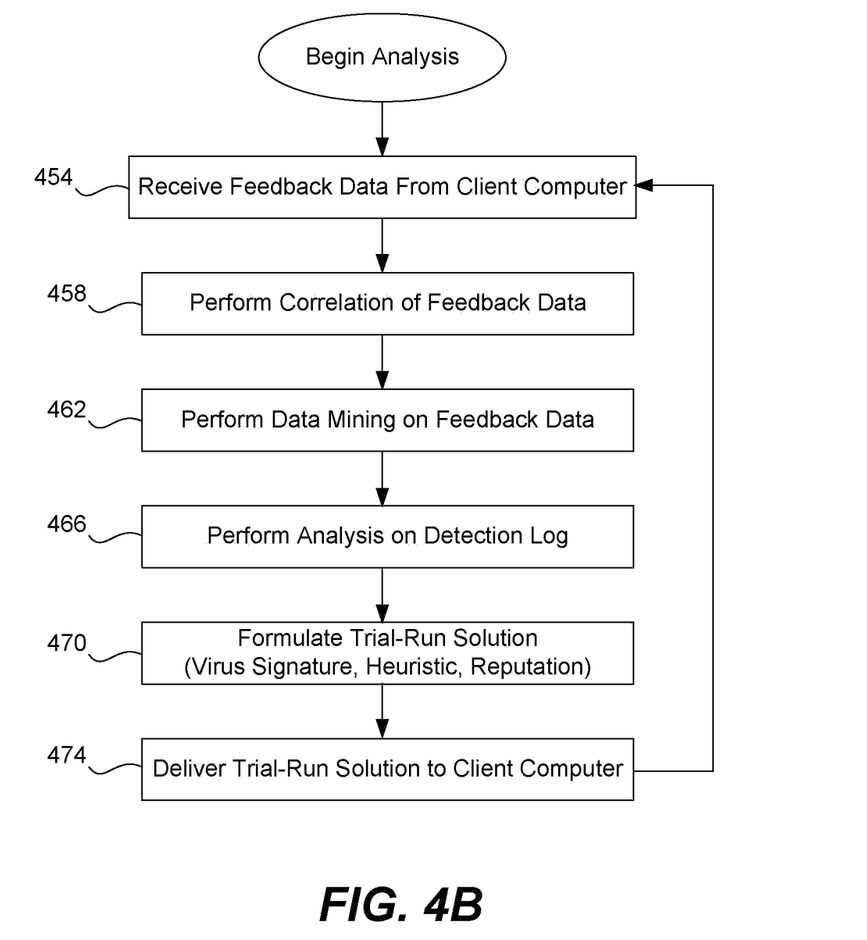
FIG. 4B is a flow diagram describing analysis of feedback data.

FIG. 4B is a flow diagram describing analysis of feedback data. In step 454 a computer at the anti-malware service receives the feedback data sent from the client computer. A single client computer may send feedback data, many different client computers may send feedback data from within a single enterprise, or feedback data from clients worldwide may be received at the anti-malware service. This feedback data may be as described above and relates to suspicious activity detected within the client computers. Step 458 performs correlation of the received feedback data. For example, as shown in FIGS. 2A, 2B and 2C, various types of feedback may be received from different types of detection engines operating on a single client machine or operating on different client machines. As shown in link 404, different detection engines may detect the same CRC value as being suspicious (e.g., CRC values 214, 224 and 238). The detection engines may be operating on a single client computer, or each may be operating upon a different client computer. By correlating the results from these different detection engines, it may be concluded that the suspicious file having the given CRC value is in fact malware and that this CRC value should be blocked in the future.

Another example of correlation is illustrated using link 408. This link shows that two different detection engines have identified a file or process as being suspicious. Once two or more detection engines identify a process or file as being suspicious, it may be concluded that this file is in fact malware, and its CRC value (or its virus signature) may be blocked in the future. As another example of correlation, once a given file is identified as malware, FIG. 2A shows that since the URL is known, that this URL may now be blocked in the future. It is assumed that because the malicious file has originated from that URL that the URL is now designated as being a source of malware. The URL may be blocked by putting it in a new pattern file, or by placing it on a blacklist at the anti-malware service. When a client request for a particular URL is routed through the anti-malware service, this particular URL may be blocked.

In step 462 data mining may be performed upon the received performed data. For example, the feedback data may indicate which malware is more prevalent in which geographic regions. If one assumes that FIGS. 2A, 2B, and 2C are from different client machines in a particular geographic region, this feedback indicates that the malware file having the identified CRC value is common in that region. Therefore, a new pattern file may be specifically tailored for that region to include the ability to block that malware. By contrast, a geographic region whose feedback shows that a particular CRC value is not present does not need a specially tailored pattern file that includes the ability to block malware corresponding to that CRC value. In this fashion, different patterns may be deployed in different geographic regions in order to better combat identified malware in those specific regions.

DATA MINING EXAMPLE

Figure 5A:
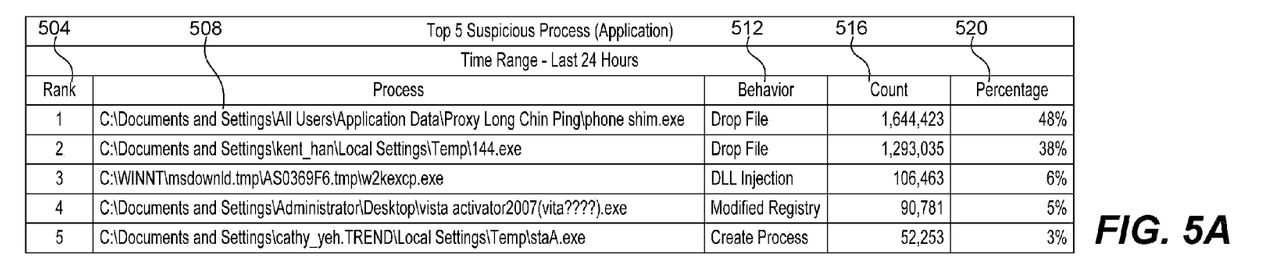
FIGS. 5A, 5B and 5C illustrate possible results from the data mining step.
Figure 5B:
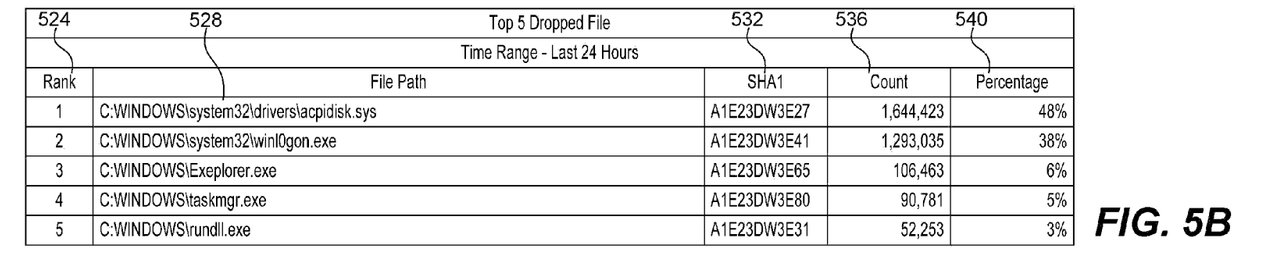
Figure 5C:
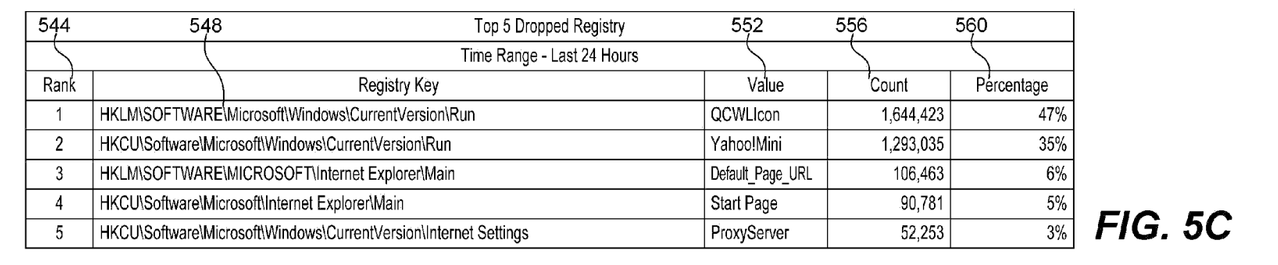

FIGS. 5A, 5B and 5C illustrate possible results from the data mining step 462. FIG. 5A is a table showing the top suspicious processes. As explained above, feedback data from any number of client computers worldwide in a particular geographic region or from a particular enterprise feed back data to the anti-malware service. This data may be mined and tabulated to form the data shown in this table. In this example, a column 504 indicates a rank of suspicious processes (most common), column 508 names a suspicious process, column 512 indicates a type of suspicious behavior that the process has performed, column 516 indicates the number of times this particular event has been performed by a particular process, and column 520 indicates a percentage of that particular suspicious event out of the total of all suspicious events received. In this example, only the top five suspicious processes are shown and data has been collected for the past twenty-four hours. The example shows that the first-ranked suspicious process is "phone_shim.exe" and the suspicious behavior that it has performed on many different client machines is dropping a file.

As shown in the behavior column 512, any of the variety of types of suspicious behavior might land a process in this table. If the anti-malware service determines that any of these processes are in fact malware, the new malware pattern file may include the virus signature of the process in order that this particular process is blocked or prevented from executing in the future on a client machine. Of course, the anti-malware service may determine that the behavior of a particular process is not harmful, in which case no action need be taken and the user is not disturbed (as the user was not alerted when this suspicious process was identified in the first place).

FIG. 5B is a table illustrating dropped files. In this example, the table lists dropped (or downloaded) files over the past twenty-four hours from any number of client machines. Column 524 indicates a rank for each dropped file, column 528 lists the name of each dropped file, column 532 lists the hash value for each dropped file, and columns 536 and 540 list the count and percentage as described above. As is known in the art, a dropped file means that a particular process has downloaded and saved a file with a particular name and this file might be suspicious. In fact, it is a near certainty that the file with the rank of three is a malicious file because the spelling of the file name is incorrect. In order to counter any malicious threat imposed by these suspicious files, the anti-malware service may dictate to any number of client machines that the behavior of a particular process be blocked because it has been downloading files that are malicious. For example, the downloader that has dropped the file "exeplorer.exe" may be blocked from downloading files in the future. Or, the particular process that is downloading files may be terminated.

FIG. 5C is a table illustrating dropped registry keys. Column 544 indicates a rank of dropped keys, column 548 indicates a particular registry key that has been dropped, column 552 lists the value of the key, and columns 556 and 560 indicate the count and percentages as described above. Each row indicates a particular registry key that has been dropped by a suspicious process (or by various suspicious processes) and the number of times that the registry key has been dropped in the past twenty-four hours. A high occurrence of a dropped registry key is certainly suspicious but not necessarily malicious. The anti-malware service may use correlation with other data and its own expertise to make a conclusion that a particular process that has dropped a large number of registry keys is in fact malicious. Once such a determination is made, that process may be blocked in the future from executing on client machines by including its virus signature within a new pattern file.

Returning to a discussion of the flow diagram, in step 470 the anti-malware service formulates a trail-run solution to be used on any number of client machines to combat malware. This solution may take the form of a new virus signature to be downloaded, a new pattern file to be downloaded, a new heuristic to be downloaded for use in a detection engine, or a list of URL's that should be blocked.

In step 474 this trial-run solution is delivered over the Internet to suitable client computers within an enterprise, in a particular geographic region, or worldwide. Additionally, the anti-malware service may craft a solution to identify malware by storing URL blacklist data within the anti-malware service itself. Those client computers that generate URL requests that are routed through the anti-malware service will find that any attempt to connect to a URL that is on the blacklist will be denied.

FEEDBACK EXAMPLE

Figure 6:
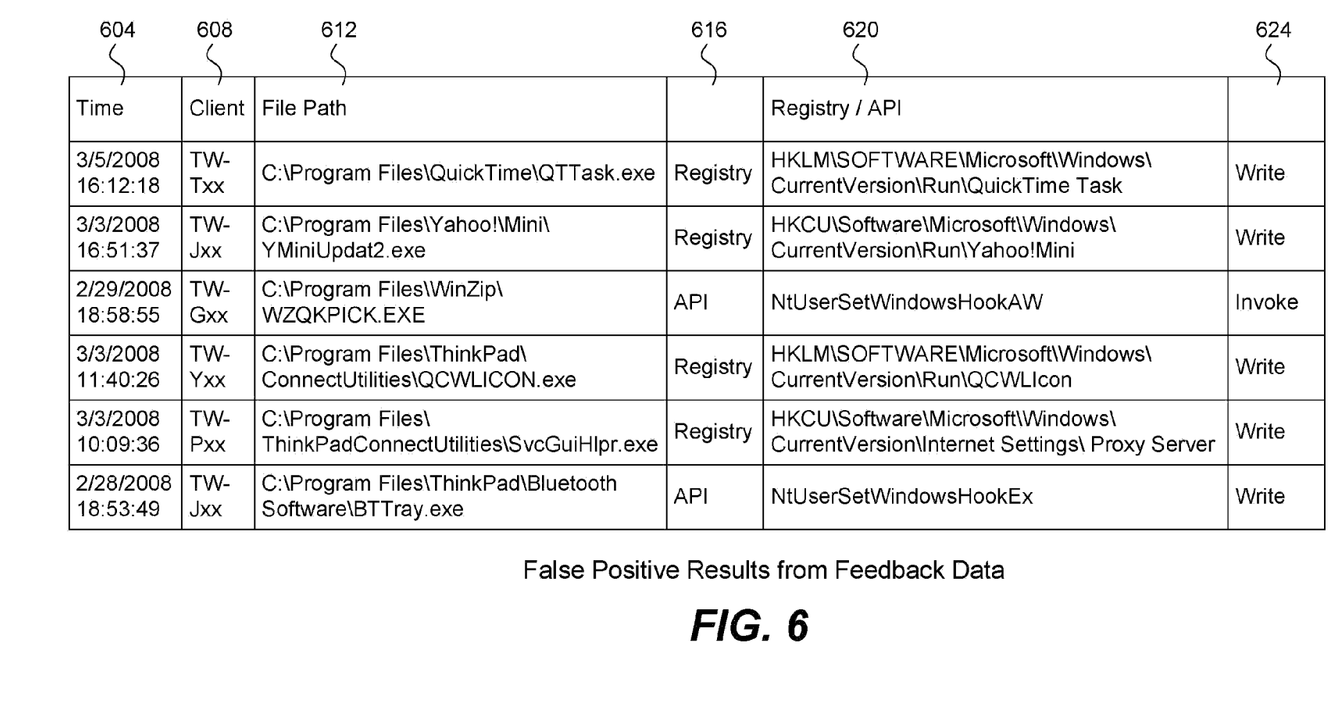
FIG. 6 is a table illustrating examples of feedback data.

FIG. 6 is a table illustrating examples of feedback data. This table shows examples of another type of feedback data that may originate with any of the various detection engines, and may indicate activity on a single client machine or activity from a variety of client machines. Column 604 indicates the time the activity occurred, column 608 indicates the particular client machine, column 612 indicates the file path of the particular process in question, column 616 indicates whether the process is attempting to modify or use a registry or API, column 620 indicates the particular registry or API in question, and column 624 indicates whether the process is attempting to write to a particular registry or invoke a particular API.

In this situation, the feedback data indicates that various processes are legitimate. Using the first row as an example, it is assumed that the CRC of this process matches a virus signature and for that reason this process and its activity has been flagged and sent back as feedback data to the anti-malware service. Because the activity is only suspicious at the time, the user is not alerted or disturbed and the silent feedback option is used. Once received at the anti-malware service, the service is able to automatically or manually determine that even though the process "Quick Time" has been marked as suspicious, it is perfectly acceptable for this process to write to the indicated registry key. Thus, the conclusion is made that this is a false positive result and that no further action with respect to the user's client machine need be taken. Of course, the anti-malware service may decide that it is incorrect for that particular virus signature to be present in the pattern file and the pattern file may be corrected to remove that virus signature. The new pattern file may then be downloaded to users' computers.

Returning to a discussion of the flow diagram, in step 470 the proposed solution may involve a new virus signature, a new heuristic or a new URL reputation. A new virus signature involves a new CRC as part of a new pattern file; a new heuristic means a new rule or rules inserted into a pattern file that includes rules; and, a new reputation means a new particular URL to block a file or a new CRC of a file that should be blocked. In each of these situations, the information may be delivered to the anti-malware service that performs the scanning or blocking in the cloud. Or, in step 474, a new pattern file is delivered back to the affected client computers. This new pattern file may include virus signatures for use in a scanning detection engine, or may include heuristics for use in a detection engines that uses heuristics. In this fashion, the anti-malware service has crafted a solution in response to the feedback data and makes the solution available either in the cloud at the anti-malware service or it is delivered back down to individual client machines.

Particular products of TREND MICRO that may include various of the detection engines on a client machine include "Trend Internet Security" and others. An example of an in-the-cloud online scanning engine is the "House Call" product also available from TREND MICRO.

COMPUTER SYSTEM EMBODIMENT

Figure 7A:
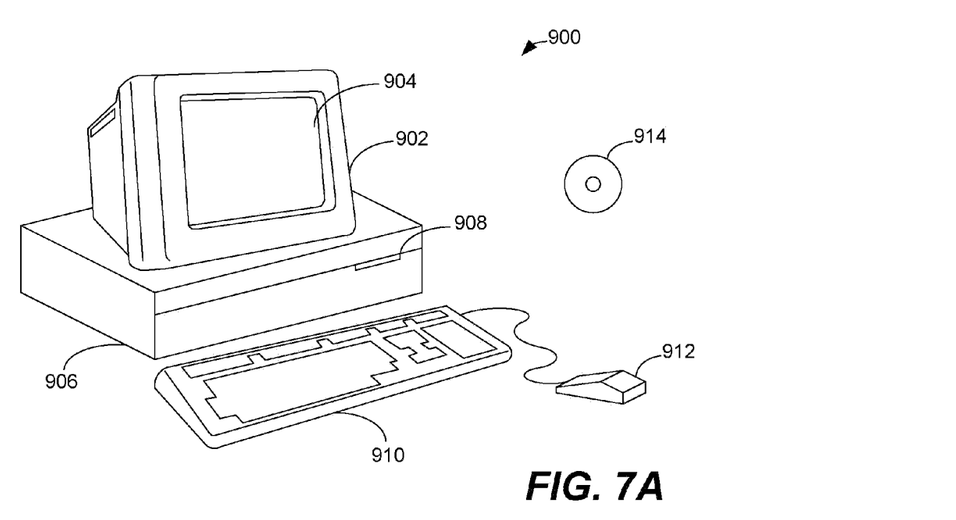
FIGS. 7A and 7B illustrate a computer system suitable for implementing embodiments of the present invention.
Figure 7B:
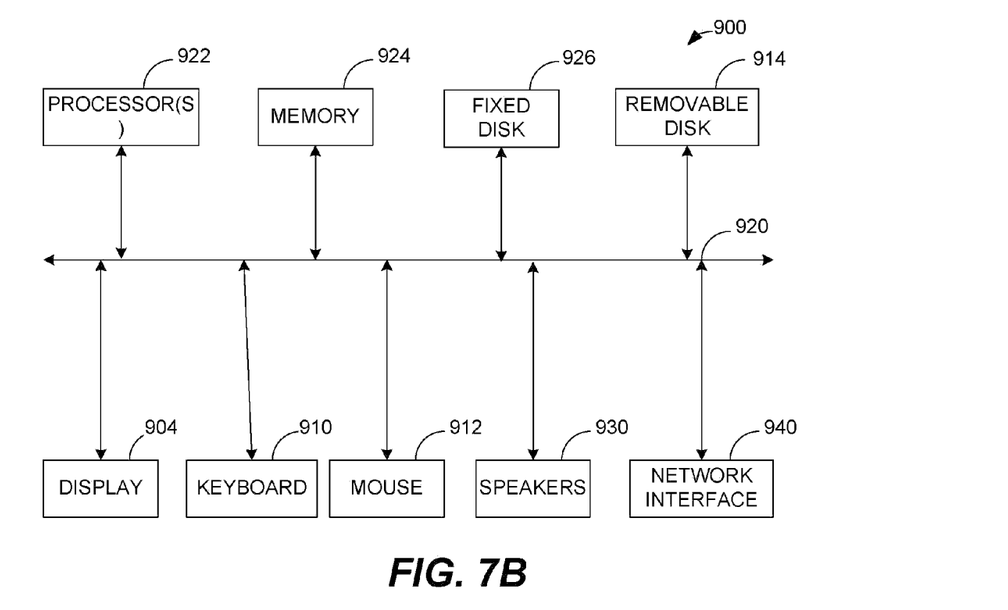

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of generating a pattern file, said method comprising:
  receiving a response at one of a plurality of client machines from a user, said response indicating that a feedback option has been selected;
  detecting a suspicious process at said one of said client machines;
  sending client feedback data from said one of said client machines to an anti-malware service to help determine whether said suspicious process is a malicious process without informing said user that said suspicious process has been detected;
  receiving feedback data from said plurality of client machines at said anti-malware service over an Internet connection, said feedback data including said client feedback data, each set of feedback data from one of said client machines providing characteristics of said suspicious process, said suspicious process not being identified as malware;
  correlating said feedback data from at least two sets of said feedback data;
  determining that said correlated feedback data indicates that said suspicious process is a malicious process;
  calculating a virus signature of a computer file associated with said malicious process;
  producing a virus pattern file that includes said calculated virus signature; and
  sending said virus pattern file over the Internet from said anti-malware service to said one of said client machines.

2. A method as recited in claim 1 further comprising:
correlating said feedback data from at least two different client machines.

3. A method as recited in claim 1 further comprising:
correlating said feedback data from at least two different detection engines from a single client machine.

4. A method as recited in claim 1 further comprising:
sending said virus pattern file with said calculated virus signature back over the Internet to at least one of said client machines.

5. A method as recited in claim 1 wherein said calculated virus signature is a CRC value or a hash value.

6. A method as recited in claim 1 further comprising:
detecting said suspicious process on said one of said client machines, said suspicious process not being identified as malware when detected; and
performing a feedback action in response to said detected suspicious process, said feedback action not alerting a user of said client machine.

7. A method as recited in claim 1, further comprising:
receiving said virus pattern file from said anti-malware service at said one of said client machines;
executing a detection engine on said client machine using said virus pattern file received from said anti-malware service; and
detecting said suspicious process on said client machine and identifying said suspicious process as malware.

8. A method as recited in claim 7 wherein said detection engine is a scanning engine, a rules-based engine, or a URL reputation-based engine.

9. A method as recited in claim 1 wherein said virus pattern file includes virus signatures or heuristics.

10. A method as recited in claim 1 wherein each set of feedback data includes a CRC value of a computer file associated with said suspicious process.

11. A method as recited in claim 1 wherein each set of feedback data includes a URL of the origin of a computer file associated with said suspicious process.

12. A method as recited in claim 7 wherein said detection engine uses a beta pattern or an aggressive pattern.

13. A method as recited in claim 7 further comprising:
detecting said suspicious process by comparing a virus signature of said suspicious process to said virus pattern file of said client machine.

14. A method as recited in claim 7 further comprising:
detecting said suspicious process by detecting a suspicious activity performed by said suspicious process.

15. A method as recited in claim 1 comprising:
receiving a plurality of different sets of feedback data from said plurality of client machines at said anti-malware service; and
matching common elements between said different sets of feedback data to help determine whether said suspicious process is a malicious process.

\* \* \* \* \*